(12) United States Patent
Campbell et al.

(10) Patent No.: US 8,589,638 B2
(45) Date of Patent: Nov. 19, 2013

(54) TERMINATING BARRIERS IN STREAMS OF ACCESS REQUESTS TO A DATA STORE WHILE MAINTAINING DATA CONSISTENCY

(75) Inventors: Michael Andrew Campbell, Waterbeach (GB); Peter Andrew Riocreux, Cheadle (GB)

(73) Assignee: ARM Limited, Cambridge (GB)

( * ) Notice: Subject to any disclaimer, the term of this patent is extended or adjusted under 35 U.S.C. 154(b) by 301 days.

(21) Appl. No.: 13/137,083

(22) Filed: Jul. 19, 2011

(65) Prior Publication Data

US 2013/0024630 A1    Jan. 24, 2013

(51) Int. Cl.
*G06F 12/00* (2006.01)

(52) U.S. Cl.
USPC ............................ 711/155; 711/E12.041

(58) Field of Classification Search
None
See application file for complete search history.

(56) References Cited

U.S. PATENT DOCUMENTS

| | | | |
|---|---|---|---|
| 2001/0034827 A1* | 10/2001 | Mukherjee et al. | 712/225 |
| 2010/0306470 A1* | 12/2010 | Speier et al. | 711/122 |
| 2011/0078417 A1* | 3/2011 | Fahs et al. | 712/216 |
| 2011/0119448 A1* | 5/2011 | Riocreux et al. | 711/131 |
| 2011/0138135 A1* | 6/2011 | Dice et al. | 711/152 |

* cited by examiner

*Primary Examiner* — Edward Dudek, Jr.
*Assistant Examiner* — Sean D Rossiter
(74) *Attorney, Agent, or Firm* — Nixon & Vanderhye P.C.

(57) ABSTRACT

A memory controller includes a comparison circuitry configured to compare the barrier context value of each write request to be issued to the memory with the barrier context values of at least some pending read requests, the pending read requests being requests received at the memory controller but not yet issued to the memory and, in response to detecting at least one of the pending read requests with an earlier barrier context value identifying a barrier transaction that has a corresponding barrier transaction in the stream of requests on the write channel that is earlier in the stream of requests than the write request, stalling the write request until the at least one pending read request has been performed; and, in response to detecting no pending read requests with the earlier barrier context value, issuing the write request to the memory.

20 Claims, 4 Drawing Sheets

TERMINATING BARRIERS IN STREAMS OF ACCESS REQUESTS TO A DATA STORE WHILE MAINTAINING DATA CONSISTENCY

BACKGROUND OF THE INVENTION

1. Field of the Invention

The field of the invention relates to accessing a data store in response to access requests and to maintaining data consistency while allowing some reordering of the access requests.

2. Description of the Prior Art

In order to be able to improve performance, data processing apparatus have been developed that allow transactions to be performed in parallel with each other and in a different order to the order they might appear in the original instruction stream. In order for this reordering to be allowable and not create data hazards, various schemes have been devised to ensure data consistency. One of these schemes involves the use of barrier transactions that are inserted into a transaction stream and that do not allow at least some transactions behind the barrier to be performed before at least some transactions in front of the barrier.

A disadvantage with a barrier transaction is that it can cause transactions behind it to stall while those in front of it complete. This can be a particular problem where a following transaction is a high priority transaction.

In order to terminate a barrier and allow the following transactions to proceed safely without allowing data hazards to occur one can simply flush all outstanding transactions preceding the barrier and allow them to complete which can be very slow, or one can keep a record of all these outstanding transactions and not allow any transactions to proceed which would cause a data hazard with any of the outstanding transactions. The determination of which transactions are safe to allow to proceed and which not is expensive in hardware.

It would be desirable to be able to terminate barriers without too large a latency or hardware cost.

SUMMARY OF THE INVENTION

A first aspect of the present invention provides data access control circuitry for controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, each of said streams of requests further comprising corresponding barrier transactions, said corresponding barrier transactions indicating corresponding points in said streams of requests that at least some requests should not be reordered around in order to maintain data consistency, said data access control circuitry comprising: barrier response generating circuitry located on said read and said write channels and being responsive to receipt of one of said barrier transactions: to issue a response to said received barrier transaction such that subsequent to requests in said stream of requests are not blocked by said barrier transaction and can be received and to terminate said received barrier transaction and not transmit said received barrier transaction further; and to mark requests subsequent to said received barrier transaction in said stream of requests with a barrier context value identifying said received barrier transaction; wherein said data access control circuitry comprises a point of data consistency on said write channel prior to said data storage recipient; and said data access control circuitry comprises comparison circuitry configured to compare said barrier context value of each write request to be issued to said data storage recipient with said barrier context values of at least some pending read requests, said, pending read requests being requests received at said data access control circuitry but not yet issued to said data storage recipient and: in response to detecting at least one of said pending read requests with an earlier barrier context value identifying a barrier transaction that has a corresponding barrier transaction in said stream of requests on said write channel that is earlier in said stream of requests than said write request, stalling said write request until said at least one pending read request has been performed; and in response to detecting no pending read requests with said earlier barrier context value, issuing said write request to said data storage recipient.

The present invention recognises that data access control circuitry to a data storage recipient with no reconvergent paths following it and with a point of data consistency on a write channel within it has certain properties that can be used to ease the barrier termination problem. In effect the various potential data hazards are considerably reduced in such circumstances. Where there are no secondary effects of the data accesses and no reconvergent paths following the data storage recipient read after read data hazards will not arise. Furthermore, if there is a point of data consistency on the write channel writes can be accepted and allowed to proceed provided that they do not overtake any hazard read requests that predate them.

The present invention addresses this remaining hazard by using barrier context values relating to the barriers that have been terminated and associated with each request to determine when issuing a write request if there is any preceding pending read request that may be a data hazard and if there is to stall the read until the one or more potential data hazard read requests have been issued. This can be done in a straightforward manner by comparing barrier context values and identifying any read requests that are ahead in the transaction stream of a barrier transaction that a write request is behind. If there is such a request then it should proceed before the write should be allowed to proceed as the barrier transaction is there to maintain data consistency. In this way with little additional hardware, one simply needs to apply the barrier context values and then compare them, barriers can be terminated thereby reducing latency.

Furthermore it is only the write requests that are delayed in order to assure data consistency which is good for performance. A read request is a request for a data value and this may be required for a critical transaction and as such delays should be kept low. A write request to a data storage recipient is generally simply a request generated to free up a line of a cache for example, and delays in committing the data to the external data store are acceptable and do not affect performance.

Thus a data storage recipient that is a convergence point can have a large reordering queue and be barrier aware with little impact on the logic required or on the latency.

In some embodiments, said data access control circuitry comprises a write response generator for generating a response to said write request at said point of consistency.

As there is a point of data consistency on the write channel a write response can be generated in response to a write request and data consistency will be maintained with the use of the comparison circuitry for comparing the barrier context values. As noted previously it is the write requests that are stalled to maintain data consistency and if they have been responded to prior to stalling them, then requests upstream in the system will not be delayed awaiting a response to a write request and therefore the latency of this system will be considerably reduced.

In some embodiments, said data access control circuitry is configured not to allow reordering of any of said requests around said barrier transactions.

Barrier transactions may apply to all requests within a system or they may apply to specific requests. In embodiments of the invention, a barrier transaction may be treated as applying to all requests whether or not it does. This may make the treatment of the barrier transactions in this context straightforward and may be acceptable in this system as the barrier transactions are terminated and no read requests are delayed. There may also be a response to all write requests received at the data access control circuitry prior to delaying any, so any delays to the write requests are within the access control circuitry itself and thus, the latency generated by these barriers is very small and it is acceptable to apply the barriers to all requests if this simplifies the system as it introduces very little extra latency.

In other embodiments said barrier response generated in circuitry is configured to detect where a write request is not subject to any preceding barrier transaction and to assign said write request a barrier context value corresponding to an earliest barrier transaction in said stream of requests associated with one of said pending read requests, such that said write request can be issued without requiring any pending reads to issue first.

Where barrier transactions are not applicable to all requests it may be desirable to make use of this property and one simple way of doing this may be to determine where a write request is not subject to any of the preceding barriers and to simply mark it with a context value of the oldest barrier of any pending read requests. If this is done then when this write request is ready to be issued there will be no pending read requests that will cause it to be delayed and it will be issued immediately. In this way the write request is dealt with in the same way as the other write requests and requires no extra hardware and yet no additional latency is introduced by applying barriers to it which it does not require.

In some embodiments, said data access control data circuitry further comprises: at least one write buffer for storing pending write requests, said pending write requests being write requests that have been received at said data access control circuitry but have not yet been issued to said data storage recipient; and at least one read buffer for storing said pending read requests; wherein said write buffer is a forwarding write buffer configured to protect against read after write data hazards, comprises said write request response generator, and is said point of consistency; said data access control circuitry comprises snoop circuitry for snooping said forwarding write buffer in response to received read requests to determine if one of said pending write requests is to an address of said received read requests and in response to detecting that it is to allow said read request to access said data value of said write request without accessing said data storage recipient.

The pending write requests may be stored in a forwarding write buffer. These are often used in data storage access control circuitry as they are an effective way of reducing read latency as read requests to the storage circuitry will snoop any pending write requests and if these write requests are to the address of the read request the read request can simply take the data from the write request and not proceed to the data store. Upstream data consistency circuitry will have ensured that any read requests received will require the data of a write request if it is pending. As these forwarding write buffers are often used to increase performance, they can also be used in embodiments of the present invention as the point of data consistency on the write channel. As the reads snoop these write buffers then write before read data hazards cannot occur and it is only the read before write data hazards that need to be worried about. These are addressed by the comparison circuitry.

In some embodiments said comparison circuitry is configured to compare a context value of each write request to be issued with a subset of said pending read requests, said pending read requests being arranged in subsets in dependence upon address ranges being accessed, a write request to an address within one of said address ranges being compared with said pending read requests within said subset corresponding to said address range.

Although the barrier context value of each write request may be compared with all pending read requests, a data hazard will only exist if they are to the same address. Address comparisons can be expensive in hardware as addresses are usually quite long and if there are many pending read requests stored then there are many comparisons to be made. Thus, an effective compromise is to compare a subset of the pending read requests depending upon an address range. In this way a coarse address comparison is performed which requires fewer bits and although latency may be increased slightly as some pending reads will need to be issued before the write can proceed when in fact they would not cause a data hazard, as noted previously the latency increase due to the stalling of the write is generally not important and the associated saving in hardware makes this a good compromise.

In some embodiments, said data storage recipient comprises a data store with a plurality of banks, said data access control circuitry comprising a plurality of read buffers corresponding to said plurality of banks for storing pending read requests to respective ones of said plurality of banks, said data comparison circuitry being configured to compare a context value of each write request to be issued to one of said plurality of banks with context values of pending read requests within said read buffer corresponding to said one of said plurality of banks.

On particularly effective way of performing this coarse address comparison is where a memory is in banks. In such a case in many data access control circuits the read buffers are also arranged in corresponding banks. If this is the case one can simply compare the barrier context values of a write that is waiting to be issued to a particular bank with the pending read request in the buffer relating to that bank. In this way use is made of existing hardware and the compromise between coarse address comparisons and perhaps a little increased latency is effectively achieved.

In some embodiments, the data access control circuitry comprises a write buffer for storing pending write requests and a read buffer for storing pending read requests, said write buffer storing said barrier context value associated with each stored pending write request and said read buffer storing said barrier context value associated with said pending read requests for at least some of said stored pending read requests.

In order for the comparison to be able to be performed, the barrier context values need to be stored associated with a write request and with at least some of the read requests. This is an additional hardware requirement but providing the queues are not too long and there are not too many barriers in the streams of request then this value need not have many bits and this additional hardware requirement will not be too large.

In some embodiments the barrier context value is stored associated with each pending read request while in other embodiments said read buffer is configured to group pending reads of a same context together and to mark one of said reads with said context value, such that in response to said comparison circuitry detecting one of said pending reads having a barrier context value indicating a bather that is earlier in said stream of requests than said barrier context value of said write request, issuing said detected one of said pending reads and said pending read requests with no bather context value that are grouped with said one of said pending reads, and to stall said write request until said issued pending read requests have been performed.

In effect one needs to know the context of each read request but if one stores the pending read requests grouped together in a buffer then one need only store the indication for the whole group and not for each read request. This gives a storage saving but provides additional constraints to the storage arrangement.

In some embodiments, said data storage recipient is a memory slave and said data access control circuitry comprises a dynamic memory controller.

Although the data storage recipient can be any data store that is a point of convergence and has no side effects on the read or write request, this may often be a memory slave and the data access control circuitry may be a dynamic memory controller.

A second aspect of the present invention provides a data processing apparatus comprising data access control circuitry according to a first aspect of the present invention, said data storage recipient and processing circuitry for processing data stored in said data storage recipient.

A third aspect of the present invention provides a method of controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, said streams of requests each further comprising corresponding barrier transactions, said corresponding barrier transactions indicating corresponding points in said streams of requests that at least some requests should not be reordered around in order to maintain data consistency, said method comprising:

in response to receiving a bather transaction in a stream of requests:

generating a response to said barrier transaction such that subsequent requests in said stream of requests are not blocked by said bather transaction and can be received;

terminating said barrier transaction and not transmitting said barrier transaction further, and marking requests subsequent to said barrier transaction in said stream of requests with a bather context value identifying said barrier transaction; wherein said write channel comprises a point of data consistency and said method comprises a further step of:

comparing said barrier context value of each write request to be issued to said data storage recipient with said barrier context values of at least some received and not yet issued pending read requests and:

in response to detecting at least one of said pending read requests with an earlier bather context value identifying a barrier transaction that has a corresponding barrier transaction in said stream of requests on said write channel that is earlier in said stream of requests than said write request, stalling said write request until said at least one pending read request has been performed; and in response to detecting none of said pending read requests with said earlier barrier context value, issuing said write request to said data storage recipient.

A fourth aspect of the present invention provides for controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, said streams of requests further comprising corresponding bather transactions, said corresponding barrier transactions indicating corresponding points in said streams of requests that at least some requests should not be reordered around in order to maintain data consistency, said data access control circuitry comprising: means for responding to barriers responsive to receipt of one of said barrier transactions on each of said read and write channels: to issue a response to said barrier transaction such that subsequent requests in said stream of requests can be received, to terminate said bather transaction and not transmit said bather transaction further, and to mark requests subsequent to said barrier transaction with a barrier context value identifying said bather; wherein said means for controlling an order of data access requests comprises a point of data consistency on said write channel prior to said data storage recipient; and said means for controlling an order of data access requests comprises comparison means for comparing said bather context value of each write request to be issued to said data storage recipient with said barrier context values of at least some pending read requests, said pending read requests being requests received at said means for controlling an order of data access requests but not yet issued to said data storage recipient and: in response to detecting at least one of said pending read requests with an earlier bather context value identifying a barrier transaction that has a corresponding barrier transaction in said stream of requests on said write channel that is earlier in said stream of requests than said write request, stalling said write request until said at least one pending read request has been performed; and in response to detecting none of said pending read requests with said earlier barrier context value, issuing said write request to said data storage recipient The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
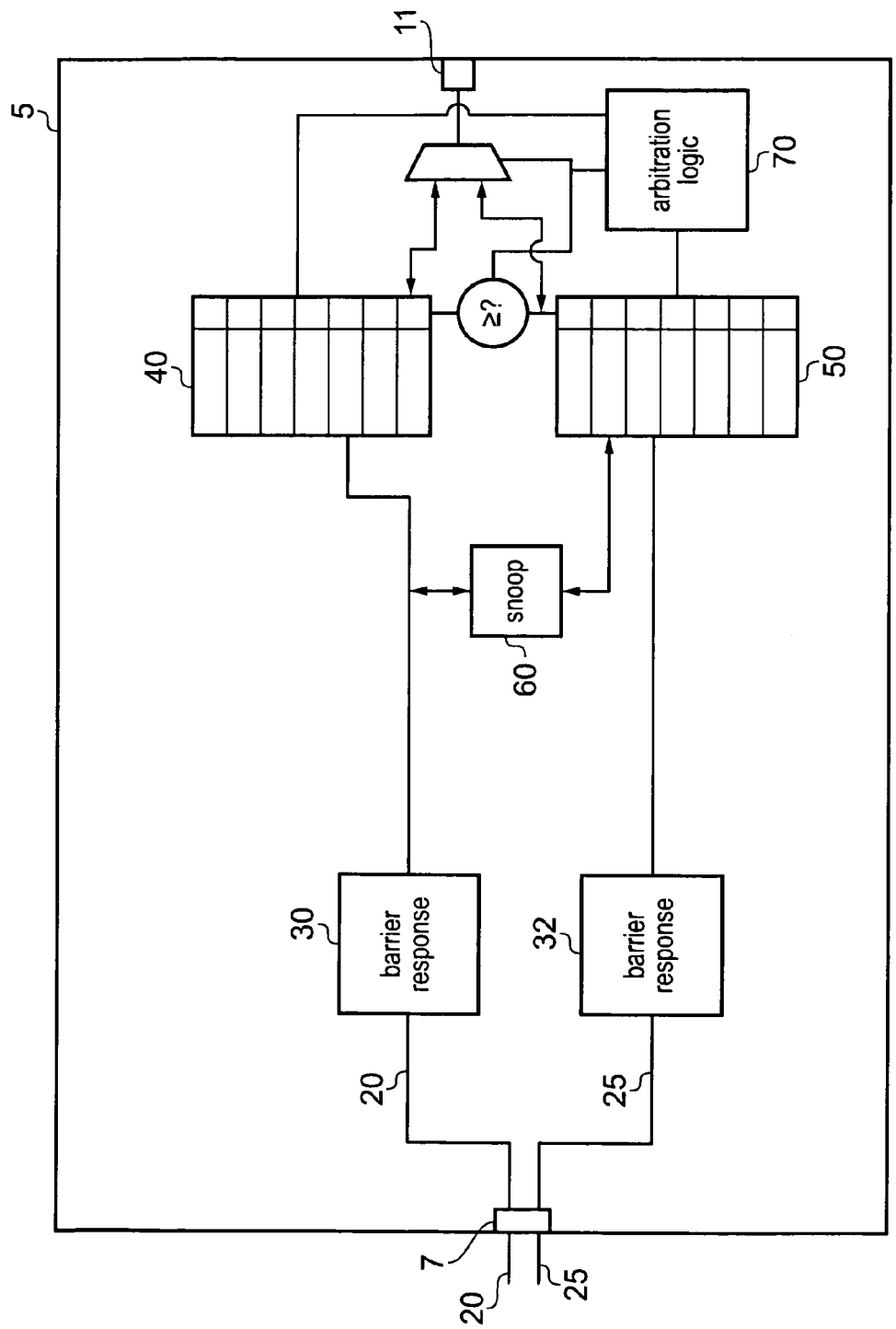
FIG. 1 schematically shows data access control circuitry according to an embodiment of the present invention.

FIG. 1 shows data access control circuitry 5 according to an embodiment of the present invention. Data access control circuitry 5 has an input port 7 for receiving read requests on a read channel 20 and write requests on a write channel 25 and an output port 11 for issuing these requests to a memory (not shown). It should be noted that the input port can in some embodiments be two ports that receive read and write channels respectively, or it may be a separate port with the requests being separated following receipt and transmitted along the separate channels.

The read and write channels 20, 25 may comprise several paths for transmitting the requests, the data, address information and responses to the requests. A response is transmitted to the read and write requests to indicate to circuitry that issued them that they have completed and a next request can be issued. This is done to maintain data consistency. In order to improve performance there may be early responses sent to these requests. Such a response will indicate that it is safe to issue a subsequent request even though the earlier request may not actually have completed. This is advantageous as it reduces latency.

As well as write requests and read requests channels 20 and 25 may also transmit barrier transactions. Barrier transactions are used to help maintain an order of requests and maintain data consistency and data coherency within a system. These barrier transactions indicate that requests ahead of the transactions and requests behind the transactions should not be re-ordered with respect to each other. In this regard a barrier transaction may apply to all requests behind it or it may only apply to a subset of them. The use of barrier transactions may enable responses to be given to read and write requests before they have actually completed as the barrier transaction will ensure that any later issued requests will not overtake requests ahead of the barrier. In this way data hazards can be managed. However, as noted in the introduction barrier transactions can themselves cause latency and thus, termination of bathers where possible which enables transactions behind them to proceed can be advantageous.

Thus, the data access control circuitry 5 of FIG. 1 has bather response units 30 and 32 on the read and write channels 20, 25 respectively. These barrier response units are responsive to receipt of a barrier transaction to issue a response to the transaction such that following transactions may proceed and to mark any following requests with a barrier context value that identifies the barrier that has been deleted. In this way, although the barrier transaction has been deleted one can still determine which requests are subject to which barriers.

In this embodiment, there is a read buffer 40 for storing pending read requests and a write buffer for storing pending write requests. Both of these buffers in addition to storing requests store the barrier context values that associate the request with a particular barrier.

In this embodiment, the write buffer 50 is a forwarding write buffer and thus, there is snoop circuitry 60 associated with it and with the read channel 20 which in response to a read request snoops the write buffer and if it detects a pending write request to a same address as a read request it will return the data value from the write buffer 50. This value will then be sent back to the issuer of the read request and a response to the read request issued. The read request will then have been completed and it will not be stored in the pending read buffer 40. In this way, the write buffer 50 ensures consistency between reads that follow writes and is in effect a point of consistency on the write channel 25.

Thus, to ensure data consistency of requests issued from the data access control circuitry 5 via output port 11 to data storage circuitry one simply needs to check that for any writes that are to be issued, there is no pending read that should be issued before the write. In effect the only possible hazard that can arise is a write following read hazard. This is because the data store being accessed in this case a slave memory device is a point of convergence with no re-convergent paths after it and one that does not have any side effects associated with the data accesses and also because there is a point of consistency on the write channel.

Thus, in this embodiment arbitration logic 70 determines which request to issue to the memory in accordance with well known arbitration constraints and if it determines that the next request to be issued is a read request from the pending read buffer this request is simply issued via output port 11. If however, it determines it is a write to be issued from write buffer 50 then prior to issuing it a check is made to check that there are no pending read requests that should be performed before this write request is performed. This is done by comparing the barrier context values of the pending read requests that are stored in the buffer alongside these requests with the context value of the write request using comparison circuitry 80.

Thus, comparison circuitry 80 compares the barrier context value of the write request that is to be issued with all the barrier context values stored in read buffer 40. If any of the barrier context values stored in read buffer 40 indicate that there are pending reads that are associated with an earlier barrier than the barrier associated with the current write request then prior to issuing the write these pending reads are issued. In this way, data consistency is maintained by simply adding an extra barrier context value to the requests, storing this value and performing a comparison. Provided the buffers are not too large and there are not too many barriers in the request streams these comparisons and additional storage constraints are small. Furthermore, as it is only writes that are stalled by this process the additional latency introduced is not high. Generally read requests affect the performance of a processing apparatus far more than writes to memory do as the read requests require data for what may be a critical operation. Writes to memory are generally performed to free up spaces in higher performance memories such as caches and thus, delays in committing the data to the external data store do not generally affect performance.

Figure 2:
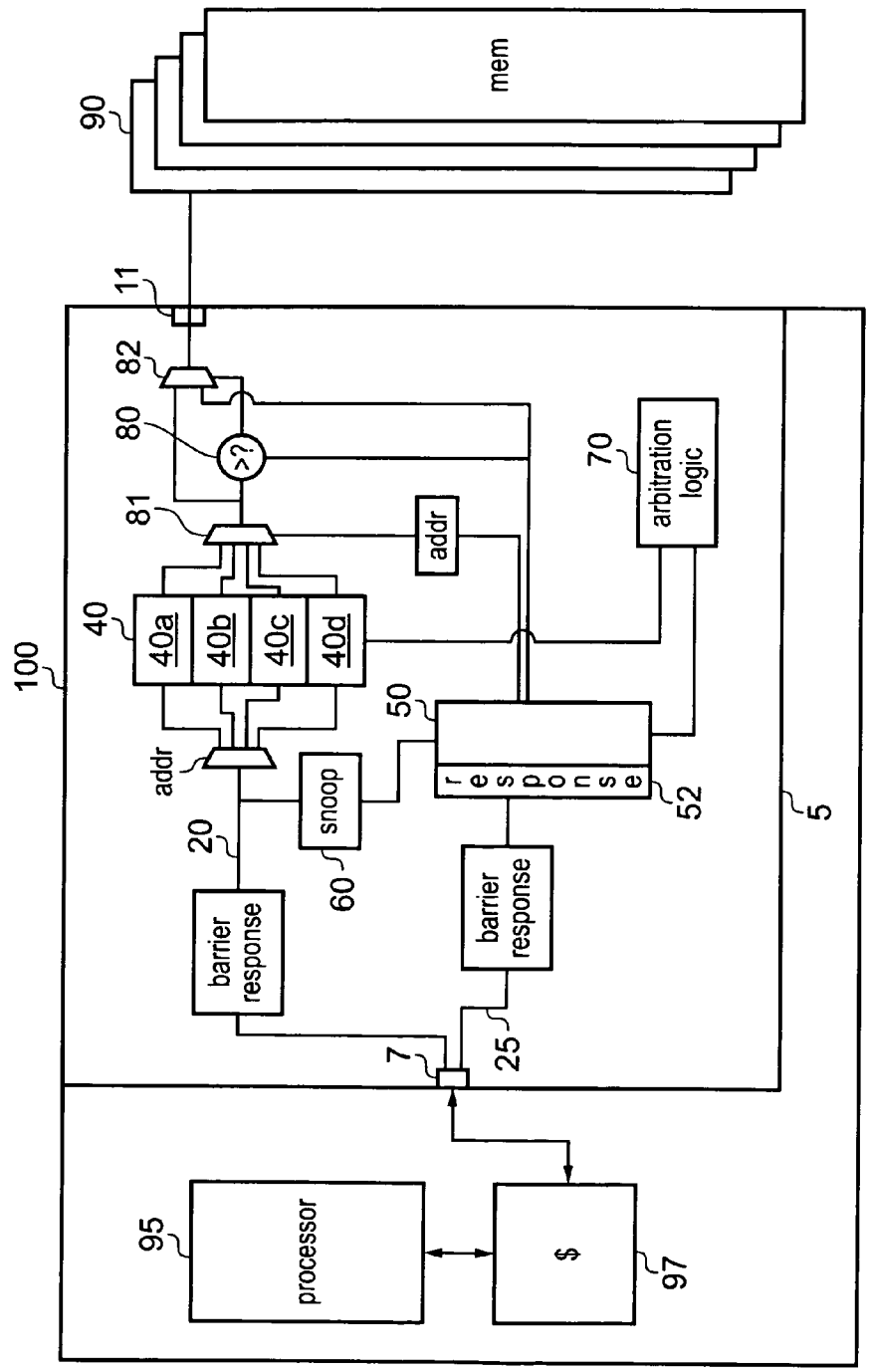
FIG. 2 schematically shows a data processing apparatus according to an embodiment of the present invention.

FIG. 2 shows a data processing apparatus 100 according to an embodiment of the present invention. Data processing apparatus 100 comprises data access control circuitry or memory controller 5, processor 95, cache 97 and a memory 90. In this embodiment the memory 90 is in the form of four memory banks. The read buffer 40 is also arranged in the form of four banks 40a, 40b, 40c, 40d, each bank storing pending reads to a respective memory bank of memory 90. This is a convenient way of arranging pending read buffers and is often implemented in memory controllers.

In this embodiment, when it comes to comparing the context values of a write to be issued with the context values of pending reads, all of the pending reads do not need to be compared to the current write request, only a subset that are pending to the bank that the write is also going to access need to be compared. In this way the number of comparisons that need to performed is reduced. If the read buffers 40 are arranged in banks in any case for performance reasons then there is no additional overhead associated with performing these fewer comparisons.

In this apparatus one can see that there is a write response generator 52 associated with write buffer 50 that generates a response to the write once the write is stored within the write buffer. This is allowable as it is a forwarding write buffer with associated snoop circuitry 60 and is a point of data consistency and as such, subsequent writes can be sent onwards to this buffer as the buffer will control the data consistency and will not allow any access to occur out of order.

In this embodiment a write request is received from cache 97, that is writing data to memory to free up a line for use by processor 95. Thus, this write is not performance critical and is sent to the memory 90 via memory controller 5. The write request passes along channel 25 to the write buffer 50 where write response unit 52 sends a response to the write request.

Arbitration logic 70 determines which of the pending reads and writes should be issued and if the next request to be issued is a read it is issued. If it is a write, it is determined from its address which read bank would store reads to this address. Multiplexer 81 then inputs the pending reads in the selected bank to comparison circuitry 80 which determines if the barrier context value associated with this write is lower in value than any of the context values stored associated with the pending reads in the accessed bank. In this regard, what needs to be determined is if there is a pending read that was before the corresponding barrier that the write request follows in the read request stream. If there is such a read then this read needs to be performed before the write and thus, this read is selected by multiplexer 82 to be output to the corresponding bank of memory 90 via output port 11. If there is no pending read or once all of these pending reads have been output then the write request is output.

Figure 3:
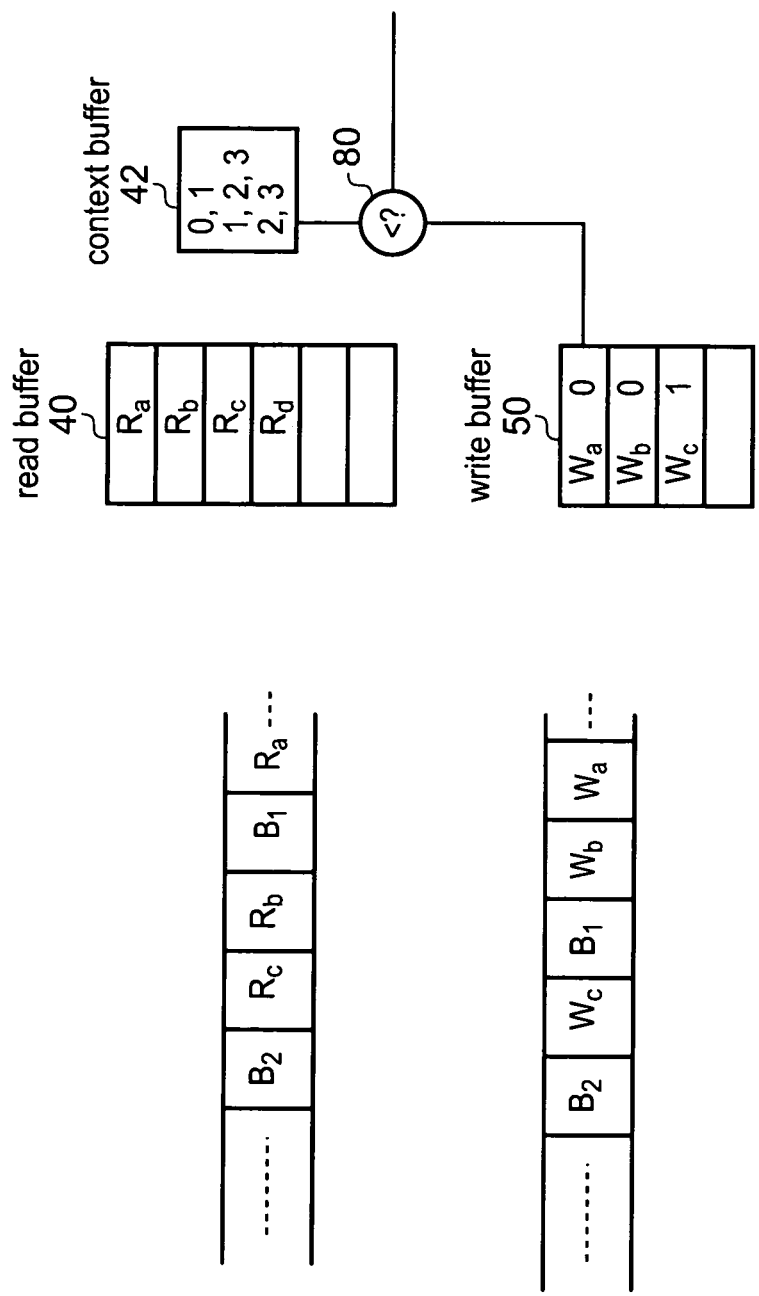
FIG. 3 shows the storage of pending read and write requests according to an embodiment of the present invention.

Although in the embodiments of FIGS. 1 and 2 barrier context values are stored with each of the pending read and write requests, this is not always the case and FIG. 3 shows an example where the read buffer simply stores the pending read requests and a context value buffer 42 associated with read buffer 40 stores the context values associated with these pending read requests. Thus, buffer 42 stores context values and an indication of the entries in the read buffer 40 that are associated with these context values. If the entries in the read buffer are grouped together then one can simply store the context value with the first and last entry indication of the group and in this way, when the comparisons are made one simply makes comparisons with the context values from buffer 42 using comparator 80 and in response to determining that there are context values that are earlier than the context values of the write buffer 50 one can identify the elements in the read buffer 40 associated with them and issue these pending reads. In this way fewer comparisons are made and less data needs to be stored.

In the example of FIG. 3 read and write stream of transactions with bather transactions within the stream are also shown. As can be seen transactions following a bather are associated with their immediately preceding barrier. In this embodiment context values are given as increasing numbers, although clearly a different numbering system could be used. As in this embodiment the values are given as increasing numbers, then in order to identify reads that need to issue before a current write can be issued, the comparator 80 is a less than comparator and determines if any of the pending read context values are less than the current write context value, if they are then they are issued.

Figure 4:
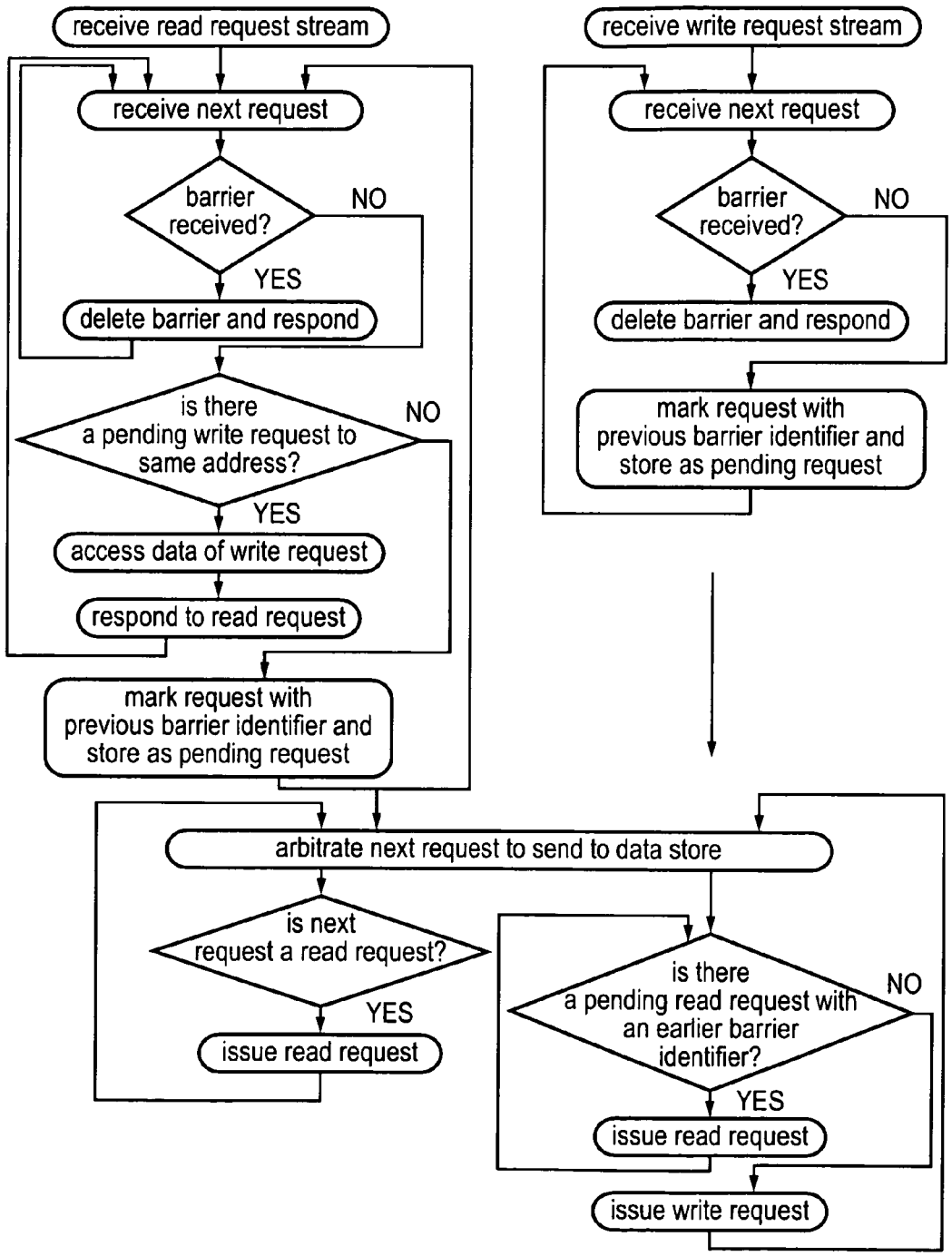
FIG. 4 shows a flow diagram illustrating a method according to an embodiment of the present invention.

FIG. 4 shows a flow diagram illustrating steps in a method according to an embodiment of the present invention. In this embodiment there are two request streams that are considered and each of them have barrier transactions within them. These barrier transactions correspond to each other as for data consistency reasons write and read requests need to maintain a certain ordering with respect to each other. Thus, the requests are received and within the stream there are barrier transactions. When a barrier transaction is received the bather transaction is deleted and responded to and requests following this are marked with an identifier that identifies that particular bather.

In this embodiment, the write buffer is a forwarding write buffer and therefore read requests on the read channel will snoop the write request buffer and if there is a write request to the address of the current read request the read request will retrieve the data from the write buffer and rather than accessing the memory will respond to the read request with the data value and the read request will not proceed further. If there is no corresponding write request in the write buffer then the read request is stored in the pending read buffer along with its barrier context value indicating the immediately preceding barrier transaction. Similarly, write requests that are received are stored in a pending write buffer along with a barrier context value.

Arbitration logic then determines which of the read and write requests should be sent next to the data store. The read and write buffers are generally re-ordering buffers and thus, the arbitration circuitry may select the requests in any particular order according to certain rules. If the next request selected by the arbitration logic is a read request this read request is issued immediately to the memory. If it is write request then it is determined if there is a pending read request with an earlier bather identifier. If there is then this read request will be issued. This continues until there are no further read requests with earlier barrier identifiers whereupon the write request can itself be issued.

In summary embodiments of the invention are based around an architecture that includes a forwarding, merging, draining write buffer, and a reordering read queue. As the write buffer is forwarding it can supply a write response with short latency and take ownership of Read after Write hazards In effect it is a point of consistency on the write channel Furthermore, as the write buffer is merging it takes ownership of write after write hazards.

The data access control circuitry is in some embodiments a memory slave and as such there are no secondary effects of performing a read or write and so therefore barriers can be honoured through data consistency, and read after read hazards are not a problem. This enables read requests to be readily accepted without delaying because of barrier considerations.

As the write buffer takes ownership of data hazards it is permitted to reorder write traffic at will. Therefore it is permissable for it to accept, and respond to, write requests irrespective of their barrier status—provided it does not allows those writes to overtake any hazard read requests that predate it.

Furthermore, rather than precisely compare address information for all writes against all reads, embodiments of the invention store a barrier context value with each request to establish its relationship to other requests. A write in the write buffer then simply has to satisfy that its context allows it proceed by comparing against the contexts of queued reads. The granularity of that address/context comparison can then be performed at any desired coarseness—permitting a logically cheap implementation—that does not unnecessarily inhibit general write progress. This design trade off can be made based on the size of address space that is being targetted and the traffic patterns and barrier density of the application. Generically this can be considered as a choice on how many epochs/contexts to track (from 2 to many), and how precise an address comparison to make (from match-any to match-exact).

With such an architecture read latency is always low, and the system designer has the ability to use an appropriate amount of write buffer storage and barrier logic to achieve desired results relating to write latency.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. Data access control circuitry for controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, each of said streams of requests further comprising corresponding barrier transactions, said corresponding barrier transactions indicating corresponding points in said streams of requests that at least some requests should not be reordered around in order to maintain data consistency, said data access control circuitry comprising:
   barrier response generating circuitry located on said read and said write channels and being responsive to receipt of one of said barrier transactions:
      to issue a response to said received barrier transaction such that subsequent requests in said stream of requests are not blocked by said barrier transaction and can be received and to terminate said received barrier transaction and not transmit said received barrier transaction further; and
      to mark requests subsequent to said received barrier transaction in said stream of requests with a barrier context value identifying said received barrier transaction; wherein
   said data access control circuitry comprises a point of data consistency on said write channel prior to said data storage recipient and
   said data access control circuitry comprises comparison circuitry configured to compare said barrier context value of each write request to be issued to said data storage recipient with said barrier context values of at least some pending read requests, said pending read requests being requests received at said data access control circuitry but not yet issued to said data storage recipient and:
      in response to detecting at least one of said pending read requests with an earlier barrier context value identifying a barrier transaction that has a corresponding barrier transaction in said stream of requests on said write channel that is earlier in said stream of requests than said write request, stalling said write request until said at least one pending read request has been performed; and
      in response to detecting no pending read requests with said earlier barrier context value, issuing said write request to said data storage recipient.

2. Data access control circuitry according to claim 1, said data access control circuitry further comprising a write response generator for generating a response to said write request at said point of data consistency.

3. Data access control circuitry according to claim 2, said data access control circuitry being configured not to allow reordering of any of said requests around said barrier transactions.

4. Data access control circuitry according to claim 1, said barrier response generating circuitry being configured to detect where a write request is not subject to any preceding barrier transaction and to assign said write request a barrier context value corresponding to an earliest barrier transaction in said stream of requests associated with one of said pending read requests, such that said write request can be issued without requiring any pending reads to issue first.

5. Data access control circuitry according to claim 2, said data access control circuitry further comprising:
   at least one write buffer for storing pending write requests, said pending write requests being write requests that have been received at said data access control circuitry but have not yet been issued to said data storage recipient; and
   at least one read buffer for storing said pending read requests; wherein
   said write buffer is a forwarding write buffer configured to protect against read after write data hazards, comprises said write request response generator, and is said point of consistency;
   said data access control circuitry comprises snoop circuitry for snooping said forwarding write buffer in response to received read requests to determine if one of said pending write requests is to an address of said received read requests and in response to detecting that it is to allow said read request to access said data value of said write request without accessing said data storage recipient.

6. Data access control circuitry according to claim 1, wherein said comparison circuitry is configured to compare a context value of each write request to be issued with a subset of said pending read requests, said pending read requests being arranged in subsets in dependence upon address ranges being accessed, a write request to an address within one of said address ranges being compared with said pending read requests within said subset corresponding to said address range.

7. Data access control circuitry according to claim 1, wherein said data storage recipient comprises a data store with a plurality of banks, said data access control circuitry comprising a plurality of read buffers corresponding to said plurality of banks for storing pending read requests to respective ones of said plurality of banks, said data comparison circuitry being configured to compare a context value of each write request to be issued to one of said plurality of banks with context values of pending read requests within said read buffer corresponding to said one of said plurality of banks.

8. Data access control circuitry according to claim 1, wherein said data comparison circuitry is configured to compare said barrier context value of each write request with said barrier context value of all pending read requests.

9. Data access control circuitry according to claim 1, comprising a write buffer for storing pending write requests and a read buffer for storing pending read requests, said write buffer storing said barrier context value associated with each stored pending write request and said read buffer storing said barrier context value associated with said pending read requests for at least some of said stored pending read requests.

10. Data access control circuitry according to claim 9, wherein said read buffer is configured to group pending reads of a same context together and to mark one of said reads with said context value, such that in response to said comparison circuitry detecting one of said pending reads having a barrier context value indicating a bather that is earlier in said stream of requests than said bather context value of said write request, issuing said detected one of said pending reads and said pending read requests with no bather context value that are grouped with said one of said pending reads, and to stall said write request until said issued pending read requests have been performed.

11. Data access control circuitry according to claim 1, wherein said data storage recipient is a memory slave and said data access control circuitry comprises a dynamic memory controller.

12. A data processing apparatus comprising data access control circuitry according to claim 1, said data storage recipient and processing circuitry for processing data stored in said data storage recipient.

13. A method of controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, said streams of requests each further comprising corresponding barrier transactions, said corresponding barrier transactions indicating corresponding points in said streams of requests that at least some requests should not be reordered around in order to maintain data consistency, said method comprising:
  in response to receiving a barrier transaction in a stream of requests:
    generating a response to said barrier transaction such that subsequent requests in said stream of requests are not blocked by said bather transaction and can be received;
    terminating said barrier transaction and not transmitting said barrier transaction further, and
    marking requests subsequent to said bather transaction in said stream of requests with a barrier context value identifying said bather transaction; wherein
  said write channel comprises a point of data consistency and said method comprises a further step of:
  comparing said bather context value of each write request to be issued to said data storage recipient with said bather context values of at least some received and not yet issued pending read requests and:
    in response to detecting at least one of said pending read requests with an earlier bather context value identifying a barrier transaction that has a corresponding bather transaction in said stream of requests on said write channel that is earlier in said stream of requests than said write request, stalling said write request until said at least one pending read request has been performed; and
    in response to detecting none of said pending read requests with said earlier barrier context value, issuing said write request to said data storage recipient.

14. A method according to claim 13, comprising a further step of issuing a response to said write requests at said point of data consistency.

15. A method according to claim 14, comprising a further step of detecting where a write request is not subject to preceding barrier transactions and assigning said write request a barrier context value corresponding to an earliest barrier transaction in said stream of requests associated with one of said pending read requests, such that said write request can be issued without requiring any pending reads to issue first.

16. A method according to claim 13, comprising the further steps of:
  storing pending write requests in a write buffer, said pending write requests being write requests that have been received but have not yet been issued to said data storage recipient and said write buffer being said point of consistency; and
  storing said pending read requests; and
  snooping said write buffer in response to received read requests to determine if one of said pending write requests is to an address of said received read requests and in response to detecting that it is said read request accessing said data value of said write request.

17. A method according to claim 13, wherein said comparing step comprises comparing a context value of each write request to be issued with a subset of said pending read requests, said pending read requests being arranged in subsets in dependence upon address ranges being accessed, a write request to an address within one of said address ranges being compared with said pending read requests within said subset corresponding to said address range.

18. A method according to claim 13, wherein said data storage recipient comprises a data store with a plurality of banks, and said method comprises a step of storing said pending read requests in a plurality of read buffers corresponding to said plurality of banks, said comparing step comparing a context value of each write request to be issued to one of said plurality of banks with context values of pending read requests within said read buffer corresponding to said one of said plurality of banks.

19. A method according to claim 13, wherein said step of comparing comprise comparing said barrier context value of each write request with said barrier context value of all pending read requests.

20. Data access control circuitry for controlling an order of data access requests to a data storage recipient, said data storage recipient being a point of convergence of said data with no downstream reconvergence and no side effects of said read or write requests, said data access requests comprising read requests received as a stream of requests on a read channel and write requests received as a stream of requests on a write channel, said streams of requests further comprising corresponding barrier transactions, said corresponding barrier transactions indicating corresponding points in said streams of requests that at least some requests should not be reordered around in order to maintain data consistency, said data access control circuitry comprising:
  means for responding to barriers, said means for responding to barriers being responsive to receipt of one of said barrier transactions on each of said read and write channels:
    to issue a response to said barrier transaction such that subsequent requests in said stream of requests can be received,
    to terminate said barrier transaction and not transmit said barrier transaction further, and
    to mark requests subsequent to said barrier transaction with a barrier context value identifying said barrier; wherein
  said data access control circuitry comprises a point of data consistency on said write channel prior to said data storage recipient; and
  said data access control circuitry comprises comparison means for comparing said barrier context value of each write request to be issued to said data storage recipient with said barrier context values of at least some pending read requests, said pending read requests being requests received at data access control circuitry but not yet issued to said data storage recipient and:

in response to detecting at least one of said pending read requests with an earlier barrier context value identifying a barrier transaction that has a corresponding barrier transaction in said stream of requests on said write channel that is earlier in said stream of requests than said write request, stalling said write request until said at least one pending read request has been performed; and in response to detecting none of said pending read requests with said earlier barrier context value, issuing said write request to said data storage recipient.

* * * * *